(12) United States Patent
Rodgers

(10) Patent No.: US 7,649,460 B2
(45) Date of Patent: Jan. 19, 2010

(54) CLIP CHIP

(76) Inventor: James Neil Rodgers, 8853 214th Place, Langley (CA) V1M 2H9

( * ) Notice: Subject to any disclaimer, the term of this patent is extended or adjusted under 35 U.S.C. 154(b) by 280 days.

(21) Appl. No.: 11/733,949

(22) Filed: Apr. 11, 2007

(65) Prior Publication Data

US 2008/0252454 A1 Oct. 16, 2008

(51) Int. Cl.
*G08B 13/14* (2006.01)

(52) U.S. Cl. .................. 340/572.1; 340/572.4

(58) Field of Classification Search ............ 340/572.1, 340/572.3, 572.4, 572.8, 500
See application file for complete search history.

(56) References Cited

U.S. PATENT DOCUMENTS

| | | | | |
|---|---|---|---|---|
| 5,508,684 | A * | 4/1996 | Becker | 340/572.5 |
| 7,098,794 | B2 | 8/2006 | Lindsay et al. | |
| 7,460,015 | B2 * | 12/2008 | Forster et al. | 340/572.3 |
| 7,477,151 | B2 * | 1/2009 | Forster et al. | 340/572.3 |

* cited by examiner

*Primary Examiner*—Toan N Pham
(74) *Attorney, Agent, or Firm*—James Neil Rodgers

(57) ABSTRACT

A solution to RFID privacy concerns as these concerns relate to consumer goods. The inventive system of this application is known as Clip Chip. It surrenders control of the administration of privacy of personal information from the retailer to the consumer of retail goods. This is accomplished by splitting the RFID transponder into two pieces. On one piece, which is always attached to the consumer item, known as the retained piece, is a unique alpha numeric identifier. On the other piece, which can be detached from the consumer item, known as the detached piece, are the standard EPC data. The two pieces are connected by conductive ink. The consumer is empowered to disable the chip at the point of purchase by tearing the two pieces of the chip in two severing the conductive ink and thereby rendering both pieces of the chip moribund. Furthermore, the Clip Chip system contemplates a method to reconnect the circuit using a secure back end system upon the circumstance of a return of the consumer item for exchange or refund.

9 Claims, No Drawings

CLIP CHIP

CROSS-REFERENCES TO RELATED APPLICATIONS

None—Not Applicable

STATEMENT AS TO RIGHTS TO INVENTION MADE UNDER FEDERALLY-SPONSORED RESEARCH AND DEVELOPMENT

None—Not Applicable

BACKGROUND OF THE INVENTION

1. Field of the Invention

The invention is in the field of Radio Frequency Identification (RFID) and more specifically is a solution to privacy concerns as these concerns relate to the purchase of consumer goods. The present inventive system surrenders control over the administration of personal purchase information from the retailer to the consumer or purchaser while still good purchased to be later verified as having been bought from a specific retailer thus enabling goods purchased to be identified for refund or exchange by the consumer or purchaser.

Radio frequency identification (hereinafter "RFID"), is a technology powered by small, wireless devices known as tags or transponders which can automatically track physical objects, animals and people when air interfacing with RFID readers, also known as interrogators. RFID can be seen as a means to explicitly label objects, animals and people so that tracking becomes automatic for back end computer host systems. Generally, in the RFID industry, an RFID tracking device which is known alternatively as a tag or as a transponder, is attached to or embedded in a product or product packaging and is air interfaced by radio frequency transmission with the antenna of an RFID reader/interrogator. The microchip itself can be as small as a grain of sand. The expense and size of a standard RFID tag or transponder package is a product of the external antenna which needs to be large enough to resonate at multiples of the wavelengths of currently authorized RFID frequencies. The antenna is usually constructed of copper or aluminum which is an expensive commodity. The authorized resonant frequencies for the antenna are Low Frequency in the 124 kHz to 135 kHz range. These have read distances of roughly two feet. There are High Frequency tags in the 13.56 MHz range with read ranges of over three feet. Moreover, there are Ultra High Frequency tags in the 860 MHz-960 MHz which have read parameters of up to 100 feet and more. RFID is being vigorously touted as a successor to optical barcode technology ubiquitous to consumer products. There are two advantages which RFID technology holds over the current barcode product identification system. First, the barcode indicates the type of object on which it is printed. For example, it will indicate to a cash register or check out automated system that the object in question is a yellow pencil of ABC brand. The RFID system goes a step further in that it emits a unique serial number which distinguishes it among millions of identically manufactured ABC brand of pencils. This unique identifying number can act as a direction finder to database entries which contain a plethora of transaction histories for individual product items. Second, barcodes are optically scanned with laser light which requires line of sight contact with readers in order for the scanning technology to operate properly. This usually means human intervention to carefully position the object to be scanned. RFID technology does not require line of sight to operate properly. It can scan hundreds of items per second. For example, a fast moving conveyor belt in a factory can be scanned for objects of interest with no need for line of sight contact.

In a supply chain application RFID is becoming ubiquitous in the tracking of crates and pallets. These are considered to be discrete, but bulk (not item level), quantities of objects. Tracking in the supply chain scenario is concerned with improving accuracy and timeliness of information regarding the whereabouts and movement of goods which comprise any specific supply chain.

In attempting to keep costs to a minimum RFID tags which are manufactured according to Electronic Product Code (hereinafter "EPC") standards carry extremely limited on board memory. Normally, the only information on the EPC tag is the unique number as well as the usual informational data of a barcode. There can also be a link to database records for any specific tag. Although the EPC tag can be up to 96 bits in data or informational length, the centralized host database can have unlimited entries or cryptographic security algorithms regarding any specific tag in question. Part of the EPC protocol is a reference service known as Object Name Service or ONS. Its purpose is to route tag queries to the database of specific tag owners or to the database of back end computer host managers. In other words, there is a system designed and in place for legitimate back end systems to track and trace all objects in an RFID system.

All communication for RFID interrogators and transponders is via an insecure medium. That medium is air, also known as the atmosphere, and sometimes referred to as the environment. In other words, all wireless communication using RFID technology travels through an atmosphere, or an environment, shared by legitimate and illegitimate users or wireless technology alike. The shared medium highlights security and privacy problems for retail consumers of products containing item level RFID tags, whether attached or embedded.

2. Description of Prior Art

There are two main privacy concerns espoused by privacy proponents and lobbyists. Specifically, these are clandestine tracking and inventorying. As RFID tags respond to reader interrogation without alerting the holder of a tagged item, surreptitious scanning of tags is a serious security threat. Pursuant to EPC protocol each tag always emits a unique identifier. This includes even those tags which protect data with cryptographic algorithms. The result is that a person in possession of an item level object which has a tag attached to it or embedded into it effectively transmits a fixed identifier number to any nearby interrogators. Therefore, tracking the whereabouts of a retail consumer in possession of an RFID tag is easy for those so inclined. This is true even if the unique identifying number is random or carries no intrinsic data. Consider it to be a beacon, like a lighthouse on a pitch black night, which never turns off.

The threat to privacy grows stronger if the unique identifier on the tag is combined in any way with personal information. An example is a grocery store which accepts payment via a credit card for twelve tagged items. These specific twelve items can be linked to the identity of the purchaser through the credit card number which is known to the grocery store at the time of purchase interrogation. Marketers can then identify and profile consumers using networks of RFID readers placed surreptiously around the grocery store. Furthermore, EPC tags carry information about the object to which they are attached, for example, the manufacturer and product code. Therefore, a person who is wearing or carrying items with EPC tags attached is subject to being inventoried. In other words, a nefarious individual could determine clothing worn, sizes, plus accessories as well as medications carried and harvest or capture this important, yet highly personal and private information into a commercial database. The target consumer could be innocently strolling a mall and be none the wiser for this intrusion. This process is known as skimming.

There have been a number of ineffective privacy protecting schemes put forward as prior art. There is a stop provision for EPC tags called "killing the tag". According to this provision, when an EPC tag receives a kill command from an interrogator the tag renders itself permanently inoperable. The kill command is PIN protected and is accomplished via the interrogator which transmits a tag specific 21 bit PIN in the EPC Class A, Gen 2 protocol. This is a very effective means of securing privacy. The tags are effectively dead at the point of sale. This is the same approach taken by a removable tag security system. Although brutally effective, these two methodologies of "killing the tag" obviate any benefits which would be garnered from post purchase tag interrogation. For example, for library books the tag is supposed to operate for the life of the book. In a retail situation, for example, receipt less item returns become a problem for the retailer if the tag is killed or taken from the retail object.

Another ineffective security approach is to put the tag to sleep rather than to kill the tag. This means to render the tag temporarily inoperative. However, if any reader is able to wake the tag then there would be no security benefit. There would have to be some sort of access control. This could take the form of PIN access. This would lead to a plethora of PIN numbers for a consumer to memorize in order to wake individual tags on countless consumer items. This solution is unworkable in a real world environment. Additionally, there are some "touch" types of security concepts; for example, touch a cellular phone to render the tag awake. In this scenario a holder of a contact less card places the card in the smart card reader located on the cellular telephone. Most European cellular telephones contain smart card readers. When so inserted the smart card chip can be activated by dialing a specific initiation number and inserting the correct PIN number. However, this type of "touch" solution negates the benefits of RFID. In other words, if a touch is necessary to activate the tag then why design or implement a wireless method of interrogation?

The prior art includes numerous attempts to secure privacy through various cryptographic methods. This method generally contradicts the business case for RFID. The business case requires cost effective tags. The more information or data which needs to be written onto the chip memory the larger and more expensive the chip will become. All cryptography systems, even the ones deemed minimalist, require serious storage space for cryptographic algorithms to be located upon chip memory systems. This increases the chip cost and complexity of manufacture. This same argument can be applied for on tag access control security systems such as hash locks or pseudonyms or off tag access control such as blocker tags or tag reader authentication such as lightweight protocols and adapted air interfaces. All of these potential solutions require high end, battery operated, and expensive RFID tags for proper implementation.

There is a gadget making itself known on the Internet as the brainchild of two amateur German engineers which they call an RFID-Zapper. It is being made available for the purpose of deactivation and destruction of passive RFID tags. This gadget borrows from the microwave oven system. In a nutshell, the microwave oven system proposes that RFID passive chips be placed in a microwave oven for 20 to 30 seconds. The high frequency electromagnetic signals from the microwave oven overloads and then fries the circuitry (the capacitor) in an RFID tag. However, it has been demonstrated that this method can damage clothes or cause small fires. The RFID-Zapper proposes to generate a strong electromagnetic field with a coil. The coil is placed as near to the target RFID tag as possible. The RFID tag then receives a strong shock of energy comparable to an electromagnetic pulse. This electromagnetic pulse blows the circuitry (capacitor) in the chip thus deactivating same. The problem with this solution is that it obviates any benefits of RFID technology for returned consumer items. The chip is destroyed and rendered useless forever.

The most important part of RFID security in a consumer environment is user perception of security and privacy. As users cannot see electromagnetic signals, impressions are formed on physical cues and industry explanations for any given RFID system. The key to commercial success is to form a secure physical access control easily perceived by the consumer, plus secure logical access, to the personal data and information on a consumer oriented RFID system. The present invention focuses on a system and method of design and engineering which physically and logically secures RFID critical data. At the same time this system and method is usable and commercially viable as an operating RFID system. This invention permits business decisions which lever all of the advantages of wireless communication while demonstrating physical and logical security for personal information which is the private property of individual consumers. Commercial viability of this invention is a function of the surrender of privacy control of consumer information to the consumer. Commercial viability is also a function of a simple design structure for this invention as well as less costly manufacturing costs as compared to prior art inventions.

Some other of the flawed prior art and inventions include IBM's Clipped Tag design which allows consumers to tear off most of a passive RFID tag's antenna. This technology was developed by IBM researcher Paul Moskowitz at IBM's Watson Research Center. The primary goal of the research was to preclude the reading of an RFID tag from a retail item carried by a consumer through the auspices of an unauthorized person in possession of an RFID interrogator. A number of alternative solutions were considered. Moskowitz reviewed the use of a blocker tag which renders nearby tags difficult to read. However, this solution meant that the blocker tag would need to be carried with the consumer at all times. This was considered to be an unwieldy proposition unacceptable to retail consumers. Also considered was a scratch off tag which included a small strip of printed electrical conductor which links the chip and a short portion of the tag's antenna. To shorten the read range consumers would scratch off the printed electrical conductor with a penny. This was deemed too complex to manufacture and less convenient for the consumer. The solution proposed by Moskowitz was a perforation which allowed the consumer to tear off most of a tag's antenna. This reduces the operational range of the antenna to a very short distance. The specifications for the perforated tag are four inches by three inches with the perforation line across each half of its dipole antenna. Once its sides are torn off, along the manufactured perforation lines, the tag remains operable, but its read range is reduced from 20 feet to a matter of several inches. Moskowitz says that consumers can make the tag unreadable through the physical process of tearing the perforation. The tag cannot be read unless presented directly in front of an interrogator. If a customer needed to return an item, the retailer could use a stationary or handheld interrogator to read the tag from a very close range. The Clip Tag technology of IBM is not really security at all. The physical measurements of the tag make it an easily identifiable target for information thieves. By admission the design of the Clip Tag technology only shortens the length of the antenna thereby reducing the read range. This technology does not disable the chip. It puts a title such as Clip Tag to a system which is far more perception than reality. The truth is that any thief with a powerful enough interrogator could still read the information on the tag. While this technology may give the consumer some solace on its face, careful scrutiny reveals a fatal flaw.

Similarly, another new technology from an Australian provider titled the Smart & Secure Retail Tag is designed to address consumer concerns that data encoded to tags on the items purchased could be read by a third party without the knowledge of the consumer. The methodology of accomplishing this is by decreasing the read distance of a tag. After the item is purchased a consumer can reduce read distance by unfolding the substrate which contains the tag antenna. An edge of the substrate which contains the antenna and which is attached to the retail product is designed so that it can be securely grasped by the consumer. When the substrate material is pulled at its edge the tag unfolds thereby reducing read range. To re-engage the original read range, in the case of a returned item for example, the edge is grasped so that the chip/antenna package can be refolded thereby setting the apparatus to the original read range. The key is that the tag is never fully disabled.

The fatal flaw to this technology is the same as that of the IBM Clip Tag. The antenna is never fully decommissioned. While this Australian system and invention allows for return of items it does not adequately address the consumer privacy issue. It provides perception of security while not actually providing real security. Like the IBM solution, a thief with an interrogator with enough harvesting power can still surreptiously interrogate a tag.

The inventor has coined the term the "Clip Chip". The term "Clip Chip" is currently the subject of a U.S. Trademark Application by the inventor. The solution proposed by this Application called "Clip Chip" is to utilize either the perforation or unfolding method outlined herein, or by other means, in a manner which prevents the information or data on the tag or transponder from being read or the consumer carrier of the tag from being tracked. In a nutshell, subject to the Summary of the Invention section herein, this invention proposes providing real privacy security in addition to appearance and perception from the vantage point of the consumer by splitting the chip into two parts. Instead of perforating or unfolding the substrate to reduce the read range by shortening the antenna, this invention proposes splitting one part of the chip from the other, thereby rendering the system unreadable. For example, a perforation could be placed on the substrate of the tag. A consumer could tear same, thereby giving the appearance and perception of security. On one side of the tag package there is a silicon component which houses one piece of the integrated chip package. On the torn off side of the attached tag would be the other part of the integrated chip package. The two sides would be connected, when operating as a whole, by a fine piece of conductive material, such as a conductive ink. At the time of sale of the consumer object the connected integrated chip package would be read using a standard RFID system. Hence all of the convenience of RFID is intact. At the time of retail check out the information stored on that piece of the integrated chip package which is torn away is automatically harvested and captured by the interrogator and communicated by secure land line to a host, back end, computer database. The part of the chip remaining attached to the item purchased would have only a simple identifier alpha numeric which would reference the purchased object to the back end host system database. This information would not be harvested directly to the back end system but would be stored separately in cryptographic format. As the chip is torn in two and is inoperable, it cannot be read by someone eavesdropping no matter how powerful the interrogator. When torn, the chip will not function as the antenna section is no longer attached to the transistor section. Furthermore, it cannot be used to track an individual as it is no longer operable. Physically it cannot reflect any information or data. However, in the event of a returned item, the connection to the host back end computer management system can be made by physically placing the communicating ink in contact with a specifically designed returned item reader. In other words, the two halves of the chip, more specifically the information on the two halves of the chip, are reconnected. In this fashion, the alpha numeric identifier is cross referenced to the host database information. In essence, the Clip Chip stores all relevant information in a management owned and controlled, back end, host computer database. This inventive system splits the critical and highly personal consumer information into two distinct pieces. One piece is useless without the other piece. This means that even if the host database is corrupted, for example by being compromised through computer hacking, the information cannot be connected to any particular item in the marketplace. The information in the host database cannot connect to the alpha numeric item unless it is returned to the place of purchase. The backend host system only has part of the piece of the puzzle as the alpha numeric identifier is stored separately and secured by cryptography. This invention offers to consumers a real choice for privacy while providing all of the perception of security through the perforation or unfolding type of physical methodologies enunciated herein. The logical security for the highly personal consumer information is accomplished by the split in two methodology activated when the chip is clipped to render it inoperable.

U.S. Pat. No. 7,098,794 titled, "Deactivating a data tag for user privacy or tamper-evident packaging", describes a system of a plethora, or array, of antennae whereby one antenna can be removed from an item thereby rendering communication of the unique identification information on that object impossible through the removed antenna.

According to this Patent there are other antennae which then take over the communication task which operate at a second frequency range, smaller than that of the first antenna. This system is outlined in claim 1 and 2 of this Patent. The point is that the second set of antenna take over and are still operable. It can be distinguished from the present application in that the present application is a solution to privacy concerns regarding item level tagging employing a system and method of separating critical personal information into two separate parts on an RFID chip, connected by conductive ink, yet subject to consumer perforation, which disables the chip.

An article titled, "RFID Guardian: A Battery-Powered Mobile Device for RFID Privacy Management" authored by Rieback, Crispo and Tanenbaum of the Department of Computer Science, Vrije Univeristeit, Amsterdam, The Netherlands, details a compact, portable, electronic device to be carried by consumers which authenticates RFID readers and blocks attempts to access consumer information from unauthorized readers. This invention proposes to warn consumers of surreptious RFID activity and then counsels to take corrective action if need be. The descriptive information of this invention can be located in the Abstract section of this article. It can be distinguished from the present application in that the present application is a solution to privacy concerns regarding item level tagging employing a system and method of separating critical personal information into two separate parts on an RFID chip, connected by conductive ink, yet subject to consumer perforation, which disables the chip.

SUMMARY OF THE INVENTION

RFID technology raises privacy concerns when its use enables untrustworthy third parties to obtain highly personal and identifiable information and data, including location information, regarding a particular consumer which the untrustworthy third parties would otherwise be unable or unauthorized, to obtain. The information may include a person's whereabouts. The information may be that a consumer has possession of a certain product; or the information may be that a consumer has used a particular service. Security becomes an issue if unauthorized third parties are able to obtain this type of information either from interception of the radio communications between RFID tags and readers (eavesdropping), through unauthorized reading of the tags (skimming), or via unauthorized access to the back end management computer network or database (hacking).

This invention solves the problem of skimming, eavesdropping and hacking through the introduction of a useful, non-obvious and novel step which the inventor has called the Clip Chip. The Clip Chip is a system and method of splitting critical personal information into two discrete and separate parts. These two parts are contained on two silicon integrated circuits which are connected by conductive ink. When connected by the conductive ink the two silicon integrated circuits make up one RFID silicon integrated circuit tag package containing an integrated antenna. However, the antenna may be part of the silicon integrated circuit or included as an attachment piece, at the discretion of the manufacturer, retailer or wholesaler. The two pieces of the integrated circuit package can be physically separated by the means of a consumer tearing a physical perforation manufactured into the RFID tag substrate or by unfolding the substrate or by other means of severing the conductive ink. Unfolding the substrate or tearing the perforation in the substrate has the effect of severing the conductive ink connection and disabling the chip. The key piece to this invention is that the disabled integrated circuit contains physical chip operation processes in two physical locations, both of which physical processes are critical to the operation of the silicon integrated circuit package which when operating as a whole is an RFID tag or transponder. When whole, the silicon integrated circuit package contains the two pieces aforementioned which form one silicon integrated circuit package connected by conductive ink. Pursuant to this invention the connection between the two parts of the silicon integrated circuit package can be physically severed by the consumer of a retail product which has the RFID tag attached to it. This act of severing renders the RFID integrated circuit package inoperable.

By way of a detailed summary this invention is a system and method whereby personal consumer information stored in the memory section of a radio frequency identification (hereinafter "RFID") transponder attached to a retail product sold by a retailer is split into two pieces for the purpose of ensuring the privacy of any personal consumer information which maybe contained on the retail product. These same two pieces are linked via conductive ink so that electromagnetic signals can traverse from one piece to the other piece and vice versa. These same two pieces are detachable one from the other through severing the conductive ink connection by tearing a perforation to the substrate which encases these same two pieces or by unfolding the substrate which encases these same two pieces thereby shearing the conductive ink and severing said conductive ink electromagnetic signal connection between these same two pieces. Each of these same two pieces is manufactured of silicon with one piece called the detachable piece containing an integrated silicon antenna and a memory section which memory section can contain all EPC relevant data as required for an RFID transponder or any additional information as required by the retailer. The other piece called the retained piece contains all transistors for powering the integrated circuit package and an alpha numeric identifier written on a write and rewrite memory section separate from the memory section implanted into the detachable piece. This invention is a method whereby when the conductive ink connection is severed; the two pieces of the silicon integrated circuit package will not function as separate and disconnected pieces. Therefore, any information contained on the silicon integrated circuit package, subsequent to severance, cannot be the subject of skimming, eavesdropping or hacking and is therefore secure.

This invention is also a system and method whereby the personal information contained on the detachable piece of the RFID integrated circuit package is read by an RFID interrogator and transmitted via secure land line to a back end computer host which records the data contained thereon (hereinafter the "consumer information"). The purchaser of an RFID enabled item with this type of RFID integrated circuit package attached (hereinafter the "consumer") is in control of security and the consumer can disable and deactivate the RFID integrated circuit package by tearing the substrate perforation or unfolding the substrate at the perforation thereby severing and disconnecting the transistors from the antenna on the silicon integrated circuit package. This invention is also a system and method whereby a return for exchange or refund of a consumer product (hereinafter the "returnable") which has the retained piece of the silicon integrated circuit package attached as contemplated by the RFID integrated circuit package system contemplated herein which is presented to the retailer by the consumer as a returnable can have the alpha numeric identifier contained on the retained piece connected to the consumer information contained in the back end computer hosted database through a laser light connection to the tag end of the conductive ink remaining on the retained piece so that the retained piece and the information in the back end database complete one circuit effectively recreating the data on the original silicon integrated circuit package.

Therefore, in the circumstance of a consumer requirement to reactivate the RFID tag, such as a returned consumer item to a retail outlet, a returnable, the integrated circuit which remains attached to the tagged consumer item is placed into a returned item interrogator. This returned item interrogator connects to the conductive ink tag end of the piece of the transponder still attached to the consumer good through the use of micro laser technology which guides a magnetic coupling mechanism thereby effectively putting the two pieces of the RFID tag back together again. According to the system and method of this invention the management, back end, host computer cannot relate the tagged item to a specific purchaser, as the identity of the item stays with the item through the auspices of the alpha numeric identifier which remains attached to the item level object. Furthermore, a hacker cannot connect information to a specific purchased item through unauthorized access to the back end database as the alpha numeric identifier stays on the piece of the integrated circuit still attached to the consumer item that has been purchased. Furthermore, any critical personal information cannot be skimmed or eavesdropped from the Clip Chip as it is in two discrete and separate places; the alpha numeric is on the part of the integrated circuit still attached to the object while the critical data, such as name, address, credit card information, has been transferred to the back end system. The part of the integrated circuit which is torn off is useless and may be disposed of. It cannot operate without the transistors contained in the attached piece. Furthermore, it cannot be reattached without the returned item interrogator which uses micro laser technology to connect the back end system to the tag end of the connective ink which is still part of the retained piece.

DESCRIPTION OF PREFERRED EMBODIMENTS

The preferred embodiment envisions product type identifiers, such as that used in traditional barcode data, left on the part of the chip attached to the consumer item, the retained piece. The part of the chip left on the item, the retained piece, can be relabeled during the check out process to a specific alpha numeric system. This alpha numeric would be programmed into the interrogator and not known to the back end system. The alpha numeric would be administered and stored by a trusted third party. Alternatively, the consumer information can be split as to product type identifiers and unique identifier across two RFID parts of a tag, such as in the preferred embodiment of this invention. By peeling off one of the two silicon chip pieces of the one tag, known as clipping the chip, a consumer can reduce the granularity of tag data and disable the RFID tag assembly. In a preferred embodiment the Clip Chip is manufactured using standard RFID techniques with the addition of Rodgers application Ser. No. 11/683,056 titled "RFID silicon antenna" which is incorporated herein by reference and Rodgers application Ser. No. 11/686,946 titled "Precisely tuned RFID antenna" which is incorporated herein by reference. application Ser. No. 11/683,056 titled "RFID silicon antenna" is a system of producing an RFID antenna using the silicon in an integrated circuit as the resonant antenna material. According to application Ser. No. 11/683,056 the base silicon sheets which make up the primary building material of the silicon chip (integrated circuit) is subjected to a laser ablation process. This process creates three dimensional nano structures on the surface of the silicon thereby raising its absorption rate of electromagnetic signals. On the reverse side of the same silicon sheet a directional antenna is etched using standard photographic reduction techniques and standard semi conductor industry manufacturing methods. The two sides of the silicon are connected through doping aluminum or copper impurities introduced into these same base silicon sheets which introduction causes conductivity within the sheet of silicon.

Rodgers application Ser. No. 11/686,946 titled "Precisely tuned RFID antenna" concerns photo resist manufacturing techniques used to produce a template or die specifically designed to mass produce RFID transponders whereby the chip and antenna becomes one integrated unit. The RFID antenna template or die is precisely tuned, using trimming algorithms and laser technology, to resonate with electromagnetic signal increments of 2 megahertz. According to application Ser. No. 11/686,946 each increment is assigned to a different category of object within a supply chain.

The two pieces of the one silicon integrated circuit tag package would contain an antenna as outlined in application Ser. No. 11/683,056 constructed of laser ablated silicon. However, this antenna would only be located on that piece of the silicon integrated circuit package which is torn off or folded off by the consumer, the detached piece. Furthermore, this same section or piece of the one tag package which is torn off or folded off by the consumer would have a tuned antenna pursuant to application Ser. No. 11/686,946 which would be specifically tuned in increments of 0.02 GHz such that each category within the object classification of a retailer using this invention can be represented by a separate frequency. As each tagged product is checked out of a retail environment using RFID industry standard methodologies the critical information contained on the removed piece of the integrated circuit package is read into a back end computer system. This information would include specific product information as required by EPC protocol and any other information required by the retailer. After interrogation the consumer may, if she wishes, tear or fold the RFID tag so that the conductive ink connection between the two pieces of the integrated circuit package are severed. As a result, the piece that is torn off, the detached piece, containing the antenna and consumer information is now moribund. It may be disposed of. This is because the piece which remains attached to the consumer product, the retained piece, contains the transistors which power the integrated circuit package. The transistors without the antenna cannot communicate. The antenna without the transistors cannot communicate.

The information remaining on the piece of the integrated circuit package still attached to the consumer object, the retained piece, contains an alpha numeric identifier as organized by the user of this preferred embodiment. This alpha numeric can be applied at the time of check out. This identifier can be held by a trusted third party or administered by the retailer. This is a process known as re-labeling. This alpha numeric identifier contained within the transistor system of the remaining piece can be powered up by inductive coupling if the tag end of the conductive ink is inductively coupled to a close proximity interrogator guided and directed by micro laser technology. This would be the case if the consumer object was returned for exchange or refund. Once inductively coupled, the alpha numeric identifier is related to the back end information through a system of complex cryptography. This system of cryptography is the responsibility of the retail entity using this preferred embodiment or, alternatively, a trusted third party holder of this data as mentioned herein. In this fashion, if the back end system is hacked, the alpha numeric identifier is not known to the back end. The alpha numeric can only be known through complex cryptographic decoding when administered by a trusted third party. The alpha numeric cannot be skimmed from the retained piece as it cannot transmit or reflect back data as there is no antenna. Likewise, there can be no eavesdropping of the retained piece as this piece of the silicon integrated circuit package has no antenna. The critical data on the piece of the integrated circuit package which has been clipped, the detached piece, cannot be accessed by skimming or eavesdropping as it has no transistors to power communication of the critical information and data.

An alternative embodiment for complete privacy is to task a trusted third party with all personal data, such as name, address, credit card number along with the alpha numeric number at the time of purchase interrogation. In this scenario only the purchase information would go to the back end computer system. If there was a problem with a credit card payment then the trusted third party, on being given proof of default, could supply enough information for the retailer to make contact with the consumer for reimbursement.

The useful, non-obvious and novel steps of this invention includes a solution to RFID privacy concerns regarding item level tagging employing a system and method of separating critical personal information into two separate pieces on an RFID chip based system. The two pieces are connected by conductive ink. The conductive ink is subject to consumer perforation, through folding or tearing or by other means of physical separation, such as clipping with scissors, which disables the chip by severing the electrical connection between the transistors and the antenna. In this manner the private information of the retail consumer is secure. The responsibility for consumer information security is shifted to the consumer thereby relieving manufacturers and retailers of potential lawsuits for failure to keep confidential information private due to skimming, eavesdropping, or hacking by unauthorized persons.

I claim:

1. A system and method whereby personal consumer information stored in a radio frequency identification (hereinafter "RFID") transponder attached to a retail product sold by a retailer is split into two pieces for the purpose of ensuring the privacy of any personal consumer information which may be contained thereon from various types of information spying, including skimming, eavesdropping or hacking comprising: the RFID transponder with an integrated circuit package said transponder being comprised of a retained piece and a detachable piece said retained piece and detachable piece being composed of silicon and being encased on, or enfolded in, a substrate and said retained piece and detachable piece being linked by conductive ink so that electromagnetic signals can traverse from one piece to the other piece and vice versa, and further whereby the detachable piece is to be retained by the retailer and whereby the retained piece is to be retained by a consumer or purchaser; a silicon antenna integrated into the detachable piece of the RFID transponder said detachable piece further having a memory section able to contain all electronic product code (EPC) data as required for the RFID transponder and inputted by a product manufacturer and or any additional information as required by the retailer; transistors in the retained piece of the RFID transponder for powering an integrated circuit package and the retained piece further having an alpha numeric identifier written in a read write memory section separate from the memory section implanted into the memory section of the detached piece of the RFID transponder; means by which the RFID transponder detachable piece and the RFID transponder retained piece are detachable from one another at the time of retail checkout by tearing a perforation to the substrate which encases these same two pieces or by unfolding the substrate which encases these same two RFID transponder pieces thereby shearing the conductive ink linking them and thereby severing said conductive ink electromagnetic signal connection between the said two pieces; the method whereby when the conductive ink connection is severed, the detachable piece and the retained piece of the said RFID transponder integrated circuit package will not function as separate and disconnected pieces and therefore any information contained on the RFID integrated circuit package cannot be the subject of consumer or purchaser information skimming, eavesdropping or hacking and is therefore secure; means to validate for return for exchange or refund a consumer product (herein and hereinafter referred to as a "returnable"), which has the retained piece of the RFID transponder attached; an RFID interrogator; a backend computer host and associated data base.

2. The system and method of claim 1 whereby further the information contained on the detachable piece of the RFID integrated circuit package is read by the RFID interrogator and transmitted by secure land line to a backend computer host which records the data contained therein and whereby still further the consumer or purchaser of an RFID enabled item with this type of RFID integrated circuit package attached is in control of security of information and can directly, or indirectly under the purchasers supervision, disable and deactivate the RFID integrated circuit package by tearing the substrate perforation or unfolding the substrate at the perforation thereby severing and disconnecting the transistors from the antenna on the silicon integrated circuit package.

3. The system of claim 2 whereby the alpha numeric identifier contained on the memory section of the retained piece of the silicon integrated circuit package can remain as an alpha numeric as written by the manufacturer or can be relabeled with the new alpha numeric identifier (hereinafter the "relabeled alpha numeric") as administered by a trusted third party and applied in a read/write fashion from the interrogator at time of check out.

4. The system and method of claim 1 whereby further a return for exchange or refund of consumer product the herein before referenced returnable, which has the retained piece of the silicon integrated circuit package attached as contemplated by the RFID integrated circuit system contemplated herein, and which is presented to the retailer by the consumer as a returnable can have the alpha numeric identifier contained on the retained piece connected to the consumer purchase information contained in the backend computer hosted database through a laser light guidance and then magnetic coupling connection to the end of the conductive ink remaining on the retained piece so that the retained piece and the information in the back end database complete one circuit effectively completing the data on the silicon integrated circuit package.

5. The system of claim 4 whereby upon presentation of a returnable for refund or exchange by the consumer the alpha numeric identifier of the retained piece can be connected to the back end host computer database through laser light system of guidance whereby a hand held interrogator magnetically couples the remaining end of the conductive ink on the retained piece and connects the original silicon integrated circuit package by using the information contained in the back end host computer database with the alpha numeric information contained within the memory of the attached piece.

6. The system of claim 1, whereby the consumer information contained on the detachable piece and read into the back end host database and read into the backend host database at the time of check out can include, but is not limited to product type, serial number, unique identifying number, and manufacturer identifier number, plus batch number and date/place of manufacturer information.

7. The system of claim 1, whereby the information contained on the retained piece of the silicon integrated circuit package can include, but is not limited to, the alpha numeric identifier which alpha numeric identifier cannot be linked to the purchaser directly as it is a separate piece of data.

8. The system, of claim 1 whereby further the method of severing the conductive ink connection between the detachable and the retained pieces may be by way of tearing a perforation the perforation through unfolding, ripping without a perforation, unfolding without the perforation, or in any way physically separating the detachable and the retained pieces so that there is no means whereby electromagnetic signals can pass between the detached and retained pieces of the silicon integrated circuit package pieces.

9. A system and method whereby personal consumer purchase information stored in a radio frequency identification (hereinafter "RFID") transponder attached to a retail product sold by a retailer is split into two pieces for the purpose of ensuring the privacy of any personal consumer information which may be contained thereon from various types of information spying, including skimming, eavesdropping or hacking comprising:

the RFID transponder with an integrated circuit package said RFID transponder being composed of silicon and being encased on, or enfolded in, a substrate and said RFID transponder further being comprised of a retained piece and a detachable piece said retained piece and detachable piece being linked by conductive ink, and further whereby the detachable piece to be retained by the retailer and whereby the retained piece to be retained by the consumer or purchaser; a silicon antenna integrated into the detachable piece of the RFID transponder said detachable piece further having a memory section able to contain all electronic product code (EPC) data as required for the RFID transponder and inputted by a manufacturer and or any additional information as required by the retailer; transistors in the retained piece of the RFID transponder for powering the integrated circuit package and the retained piece further having an alpha numeric identifier written in a read write memory section separate from the memory section implanted into the memory section of the detached piece of the transponder; means by which the RFID transponder detachable piece and the RFID transponder retained piece are detachable from one another at the time of retail checkout by tearing a perforation to the substrate which encases these same two pieces or by unfolding the substrate which encases these same two RFID transponder pieces thereby shearing the conductive ink linking them and thereby severing said conductive ink electromagnetic signal connection between the said two pieces; a method whereby when the conductive ink connection is severed, the detachable piece and the retained piece of the said silicon transponder integrated circuit package will not function as separate and disconnected pieces and therefore any information contained on the silicon integrated circuit package cannot be the subject of consumer or purchaser information skimming, eavesdropping or hacking and is therefore secure; means to validate for return for exchange or refund a consumer product (herein and hereinafter referred to as the "returnable"), which has the retained piece of the RFID transponder attached; an RFID interrogator; a backend computer host and associated data base, and whereby the relabeled alpha numeric identifier written onto the memory of the retained piece can be transmitted to a trusted third party for encryption and safekeeping until requested by the consumer returning a consumer item for exchange or refund whereby the relabeled alpha numeric is cross referenced to the original alpha numeric and this original alpha numeric date is transmitted via secure land line to the retailer so that the silicon transponder integrated circuit package can be reconnected enabling the original alpha numeric and the consumer information to be electronically available to the retailer.

* * * * *